(12) United States Patent
Aiba et al.

(10) Patent No.: US 7,460,319 B2
(45) Date of Patent: Dec. 2, 2008

(54) MONITORING LENS APPARATUS AND MONITORING CAMERA

(75) Inventors: Daigo Aiba, Saitama (JP); Shigeru Yoshida, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/798,887

(22) Filed: May 17, 2007

(65) Prior Publication Data

US 2007/0268596 A1 Nov. 22, 2007

(30) Foreign Application Priority Data

May 19, 2006 (JP) .......................... P2006-140518

(51) Int. Cl.
*G02B 7/02* (2006.01)
(52) U.S. Cl. ....................... 359/819; 359/811
(58) Field of Classification Search ................... 359/819
See application file for complete search history.

(56) References Cited

U.S. PATENT DOCUMENTS 4,536,789 A * 8/1985 Bains .......................... 348/81
7,101,095 B2 * 9/2006 Kajino et al. ............... 396/427
2006/0103954 A1 * 5/2006 Hamasaki et al. ........... 359/825

FOREIGN PATENT DOCUMENTS

| DE | 10318196 A1 | 10/2003 |
|---|---|---|
| JP | 2000-209471 A | 7/2000 |
| JP | 2000-305138 A | 11/2000 |
| JP | 2001-045344 A | 2/2001 |
| JP | 2004-54186 A | 2/2004 |

* cited by examiner

*Primary Examiner*—Jordan M. Schwartz
*Assistant Examiner*—James C Jones
(74) *Attorney, Agent, or Firm*—Birch, Stewart, Kolasch & Birch, LLP

(57) ABSTRACT

A monitoring lens apparatus is provided and includes a fixed cylinder, a first lens frame provided at an inner portion of the fixed cylinder and movable in an optical axis direction, a second lens frame provided at the inner portion of the fixed cylinder and movable in the optical axis direction, a first ring provided rotatably to the fixed cylinder and provided with a cam groove for driving the first lens frame, a second ring provided rotatably to the fixed cylinder on an object side of the first ring and provided with a cam groove for driving the second lens frame, and an extended portion provided integrally with the first ring and extended to the object side to cover an outer periphery of the second ring.

9 Claims, 5 Drawing Sheets

MONITORING LENS APPARATUS AND MONITORING CAMERA

BACKGROUND OF THE INVENTION

1. Field of the Invention

The present invention relates to a monitoring lens apparatus and a monitoring camera.

2. Description of Related Art

In recent times, in, for example, financial institutions, stores for selling commodities and the like, a monitoring camera (monitoring CCTV camera) is widely used. Particularly, in recent years, a demand for a dome type small-sized monitoring camera is increasing.

FIG. 4 is a perspective view showing a dome type monitoring camera 100. Further, FIG. 5 is a sectional view showing a state of attaching the monitoring camera 100 to a ceiling. As shown by FIG. 4 and FIG. 5, the monitoring camera 100 is provided with a dome-like outlook, and includes a base 102, a transparent case member 104, and a monitoring lens apparatus 106 arranged at an inner portion of the case member 104. As shown by FIG. 5, the monitoring lens apparatus 106 is attached to the base 102 to be able to make an angle θ variable relative to the base 102. Further, the monitoring lens apparatus 106 can be rotated relative to the base 102 by constituting a rotational axis by a center line C.

As shown by FIG. 4 and FIG. 5, on an inner side of the case member 104, a cover member 108 is mounted to the monitoring lens apparatus 106. The cover member 108 is provided for covering to conceal the monitoring lens apparatus 106. The cover member 108 is provided with an opening 110 in correspondence with a range of changing the angle θ of the monitoring lens apparatus 106. The cover member 108 can be rotated relative to the base 102 by constituting the rotational axis by the center line C along with the monitoring lens apparatus 106.

An outer periphery of the monitoring lens apparatus 106 is provided with a focus ring 112 for adjusting a focus position, and a zoom ring 114 for adjusting a focal length. The focus ring 112, the zoom ring 114 are provided in correspondence with positions of a focus lens (group), a zoom lens (group) provided to the monitoring lens apparatus 106 and are respectively provided on a front side (object side) and a rear side of a lens barrel of the monitoring lens apparatus 106.

The focus ring 112, and the zoom ring 114 are respectively provided with lock knobs 116, 118. The lock knobs 116, 118 are respectively screwed to engage with the focus ring 112, the zoom ring 114. When the lock knobs 116, 118 are fastened, front ends of the lock knobs 116, 118 are brought into contact with a member at an inner portion to thereby fix rotational positions of the focus ring 112, the zoom ring 114.

When the monitoring camera 100 is installed at a ceiling, a wall face or the like of a store or the like, and a direction of an optical axis of the monitoring lens apparatus 106 is set to a direction, in a state of detaching the case member 104, the focal length, the focus position are adjusted. At this occasion, the cover member 108 is constituted integrally with the monitoring lens apparatus 106, a troublesome operation is needed for detaching the cover member 108, and therefore, the focal length, the focus position are adjusted by inserting the finger tip of an operator from the opening 110 of the cover member 108 and manually operating the focus ring 112, the zoom ring 114. Further, after setting the focal length, the focus position to a desired state, by fastening the lock knobs 116, 118, the focus ring 112, the zoom ring 114 are fixed.

Such a monitoring camera is disclosed in, for example, JP-A-2000-305138, JP-A-2000-209471 and JP-A-2001-45344.

However, the monitoring camera 100 in recent times is downsized, and also the mounted monitoring lens apparatus 106 is downsized. Further, in the small-sized monitoring camera 100, there is brought about a situation in which only a necessary minimum space can be ensured at peripheries of the focus ring 112, the zoom ring 114. Therefore, it is difficult to insert the finger tip to the peripheries of the focus ring 112, the zoom ring 114, and thus focus and zoom cannot be adjusted simply and conveniently.

Particularly, in the small-sized monitoring camera 100, the opening 110 of the cover member 108 is provided with a necessary minimum range (width of about 2 cm through 3 cm) in accordance with a diameter of the monitoring lens apparatus 106. Therefore, it is necessary for the operator to operate the focus ring 112, the zoom ring 114 by inserting the finger from the narrow opening 110 to the inner portion, and a very troublesome operation is needed. Particularly, the zoom ring 114 is arranged on a depth side of inside of the cover member 108, and therefore, a troublesome operation of inserting the finger tip of the operator to a vicinity of the base 102 and rotating the zoom ring 114 is needed.

Similarly, also in operating the lock knobs 116, 118, it is necessary to operate the lock knobs 116, 118 by inserting the finger tip from the narrow opening 110, and therefore, a very troublesome operation is requested. Therefore, it is conceivable that the lock knobs 116, 118 are fastened insufficiently, and there is brought about a concern that the lock knobs 116, 118 are released from being fixed in using the monitoring camera 100, and setting of the focus position, the zoom position is shifted. In such a case, a desired image cannot be provided by the monitoring camera 100.

Particularly, when the angle θ of the monitoring lens apparatus 106 shown in FIG. 5 is small, a space between the base 102 and the monitoring lens apparatus 106 is narrowed, and therefore, the operation of the focus ring 112, the zoom ring 114, the lock knobs 116, 118 becomes further difficult.

Further, even when the monitoring camera 100 is not provided with the case member 104, the cover member 108, there is a case in which the operation of the focus ring 112, the zoom ring 114 becomes complicated. As described above, the operation of the focus ring 112, the zoom ring 114 is carried out after setting the direction of the optical axis of the monitoring lens apparatus 106 to the direction, and therefore, when the monitoring lens apparatus 106 is directed in a direction which is difficult to be operated for a direction of the body, a direction of the hand of the operator, the rings are operated by twisting the hand or the like, and thus a complicated operation is needed. Also in this case, particularly the zoom ring 114 is arranged on the side of the base 102 of the monitoring lens apparatus 106 (depth side in view from the operator), and therefore, the operation becomes difficult.

SUMMARY OF THE INVENTION

An object of an illustrative, non-limiting embodiment of the present invention is to a monitoring lens apparatus and a monitoring camera which are novel and improved capable of easily adjusting the focus and zoom.

According to an aspect of the invention, there is provided a monitoring lens apparatus including a fixed cylinder, a first lens frame provided at an inner portion of the fixed cylinder and movable in an optical axis direction, a second lens frame provided at the inner portion of the fixed cylinder and movable in the optical axis direction, a first ring provided pivotably to the fixed cylinder and provided with a cam for driving the first lens frame, a second ring provided pivotably to the fixed cylinder on an object side of the first ring and provided with a cam for driving the second lens frame, and an extended portion provided integrally with the first ring and extended to the object side to cover an outer periphery of the second ring.

According to such a constitution, the first lens frame is provided at the inner portion of the fixed cylinder by being made to be movable in the optical axis direction, the second lens frame is provided at the inner portion of the fixed cylinder by being made to be movable in the optical axis direction. The first ring provided with the cam for driving the first lens is provided by being made to be pivotable to the fixed cylinder. Further, the second ring provided with the cam for driving the second lens frame is provided by being made to be pivotable to the fixed cylinder on the object side of the first ring. The extended portion is integrally provided to the first ring and extended to the object side to cover the outer periphery of the second ring. Therefore, on the object side of the monitoring lens apparatus, the second ring arranged on the object side can be operated, further, the extended portion is extended to the object side, and therefore, the first ring can be operated.

Further, there may be constructed a constitution further including a first operating portion provided at the extended portion and held in operating the first ring, and a second operating portion provided at the second ring and held in operating the second ring, wherein the first operating portion and the second operating portion are provided proximately to a vicinity of an end portion on the object side.

According to such a constitution, the first operating portion held in operating the first ring is provided at the extended portion, the second operating portion held in operating the second ring is provided at the second ring. Further, the first operating portion and the second operating portion are provided to be proximate to the vicinity of the end portion on the object side. Therefore, the first operating portion and the second operating portion can easily be operated at the vicinity of the end portion on the object side of the monitoring lens apparatus.

Further, there may be constructed a constitution further including a lock knob inserted to an opening hole portion provided at the extended portion, engaged with a screw hole provided at the second ring for fixing both of rotational positions of the first and the second rings.

According to such a constitution, the lock knob is provided at the extended portion, and therefore, the lock knob is provided on the object side of the monitoring lens apparatus, and operation of the lock knob can easily be carried out. Further, both of the rotational positions of the first and the second rings can be fixed, and therefore, the rotational positions of the first and the second rings can be fixed without being accompanied by a complicated operation.

Further, there may be constructed a constitution in which the open hole portion is constituted by a shape of a long hole in accordance with a change in a relative angular position of the first ring and the second ring.

According to such a constitution, it can be avoided that when the relative angular position of the first ring and the second ring is changed, an end portion of the open hole portion and the lock knob are brought into contact with each other.

Further, there may be constructed a constitution in which the first lens frame holds a zoom adjusting lens, the second lens frame holds a focus adjusting lens, the first ring is a zoom ring, and the second ring is a focus ring.

According to such a constitution, the zoom adjusting lens can be driven by operating the zoom ring, the focus adjusting lens can be driven by operating the focus ring.

According to another aspect of the invention, there is provided a monitoring camera including a monitoring lens apparatus including a fixed cylinder, a first lens frame provided at an inner portion of the fixed cylinder and movable in an optical axis direction, a second lens frame provided at the inner portion of the fixed cylinder and movable in the optical axis direction, a first ring provided pivotably to the fixed cylinder and provided with a cam for driving the first lens frame, a second ring provided pivotably to the fixed cylinder on an object side of the first ring and provided with a cam for driving the second lens frame, and an extended portion provided integrally with the first ring and extended to the object side to cover an outer periphery of the second ring, a transparent case member for covering the object side of the monitoring lens apparatus, and a cover member provided on a side of the monitoring lens apparatus of the case member, covering the monitoring lens apparatus, and having an opening in correspondence with a front end portion on the object side of the monitoring lens apparatus.

According to such a constitution, the first lens frame of the monitoring lens apparatus is provided at the inner portion of the fixed cylinder by being made to be movable in the optical axis direction, the second lens frame is provided at the inner portion of the fixed cylinder by being made to be movable in the optical axis direction. The first ring of the monitoring lens apparatus is provided with the cam for driving the first lens frame and is provided pivotably to the fixed cylinder. Further, the second ring of the monitoring lens apparatus is provided with the cam for driving the second lens frame and is provided pivotably to the fixed cylinder on the object side of the first ring. The extended portion of the monitoring lens apparatus is provided integrally with the first ring and is extended to the object side to cover the outer periphery of the second ring. Further, the transparent case member covers the object side of the monitoring lens apparatus, the cover member is provided to cover the monitoring lens apparatus on the side of the monitoring lens apparatus of the case member, and includes the opening in correspondence with the front end portion of the object side of the monitoring lens apparatus. Therefore, on the object side of the monitoring lens apparatus, the second ring arranged on the object side can be operated, further, since the extended portion is extended to the object side, the first ring can be operated. Therefore, even when the opening of the cover member is narrow, or even when a sufficient space cannot be ensured at a periphery of the monitoring lens apparatus, the first and the second rings can easily be operated on the object side of the monitoring lens apparatus.

Further, there may be constructed a constitution further including a first operating portion provided at the extended portion of the monitoring lens apparatus and held in operating the first ring, and a second operating portion provided at the second ring of the monitoring lens apparatus and held in operating the second ring, wherein the first operating portion and the second operating portion are provided proximately to a vicinity of an end portion on the object side of the monitoring lens apparatus.

According to such a constitution, the first operating portion held in operating the first ring is provided at the extended portion of the monitoring lens apparatus, the second operating portion held in operating the second ring is provided at the second ring of the monitoring lens apparatus. Further, the first operating portion and the second operating portion are provided proximately to the vicinity of the end portion on the object side of the monitoring lens apparatus. Therefore, the first operating portion and the second operating portion can easily be operated at the vicinity of the end portion on the object side of the monitoring lens apparatus.

Further, there may be constructed a constitution further including a lock knob inserted to an open hole portion provided at the extended portion of the monitoring lens apparatus, engaged with a screw hole provided at the second ring, and fixing both of rotational positions of the first and the second rings.

According to such a constitution, the lock knob is provided at the extended portion, and therefore, the lock knob is provided on the object side of the monitoring lens apparatus, and operation of the lock knob can easily be carried out. Further, both of the rotational positions of the first and the second rings can be fixed, and therefore, the rotational positions of the first and the second rings can be fixed without being accompanied by a complicated operation.

Further, there may be constructed a constitution in which the opening hole portion is constituted by a shape of a long hole in accordance with a change in a relative angular position of the first ring and the second ring.

According to such a constitution, it can be avoided that when the relative angular position of the first ring and the second ring is changed, the end portion of the opening hole portion and the lock knob are brought into contact with each other.

Further, there may be constructed a constitution in which the first lens frame holds a zoom adjusting lens, the second lens frame holds a focus adjusting lens, the first ring is a zoom ring, and the second ring is a focus ring.

According to such a constitution, the zoom adjusting lens can be driven by operating the zoom ring, the focus adjusting lens can be driven by operating the focus ring.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of the invention, there can be provided a monitoring lens apparatus and a monitoring camera which are novel and improved capable of easily adjusting the focus, the zoom.

An exemplary embodiment of the invention will be explained in details in reference to the attached drawings as follows. Further, in the specification and the drawings, with regard to constituent elements having essentially the same functions and constitutions, a duplicated explanation will be omitted by attaching the same notations thereto.

Figure 1:
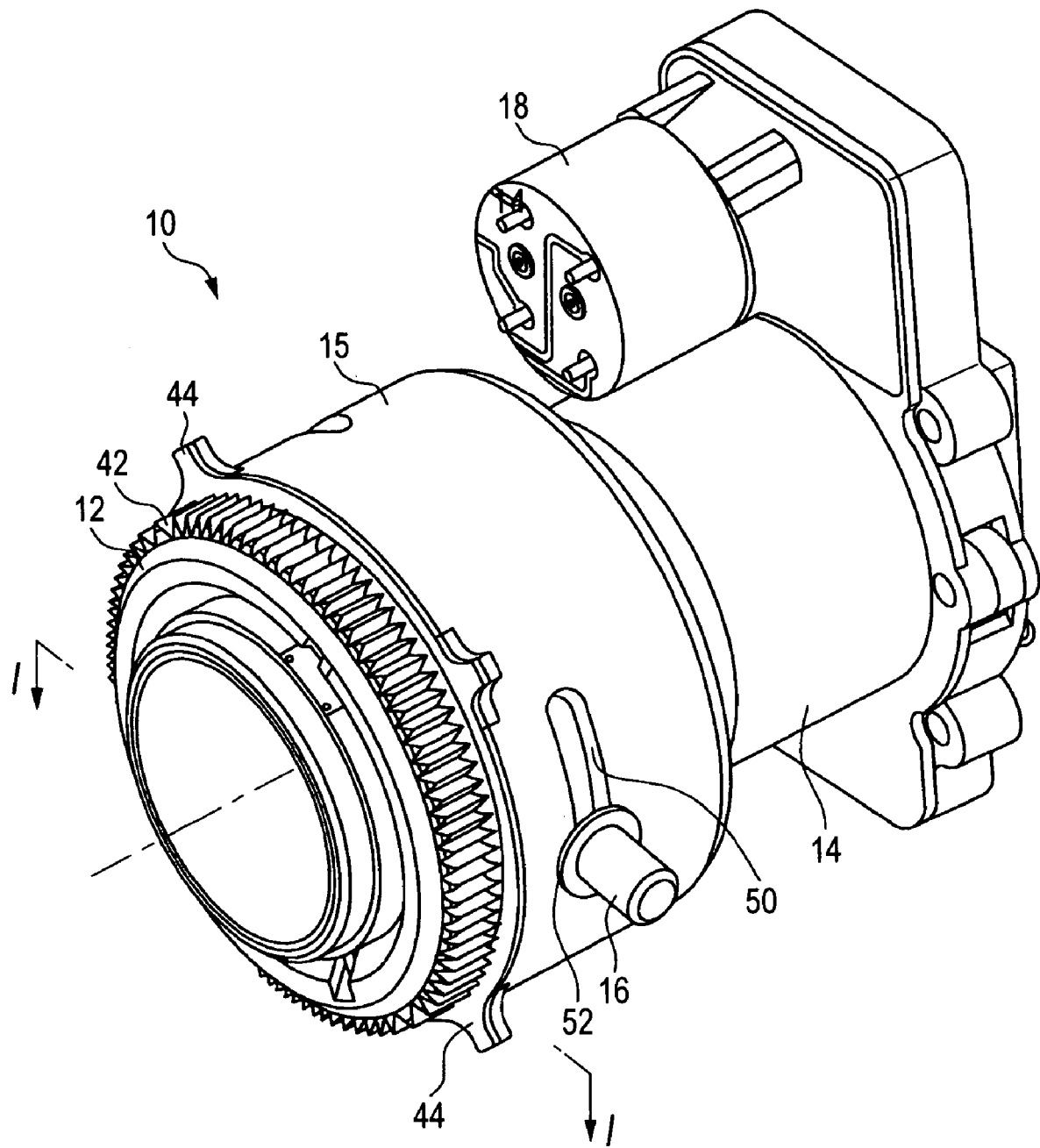
FIG. 1 is a schematic view showing constitutions of a monitoring lens apparatus according to an exemplary embodiment of the invention and a periphery thereof.

FIG. 1 is a schematic view showing constitutions of a monitoring lens apparatus 10 according to an exemplary embodiment of the invention and a periphery thereof. The monitoring lens apparatus 10 is mainly used for a monitoring camera as described later. As shown by FIG. 1, the monitoring lens apparatus 10 includes a focus ring 12, a zoom ring 14, and a lock knob 16 at an outer periphery thereof. Further, the monitoring lens apparatus 10 is provided with a drive apparatus 18 for driving an infrared ray filter mentioned later.

Figure 2:
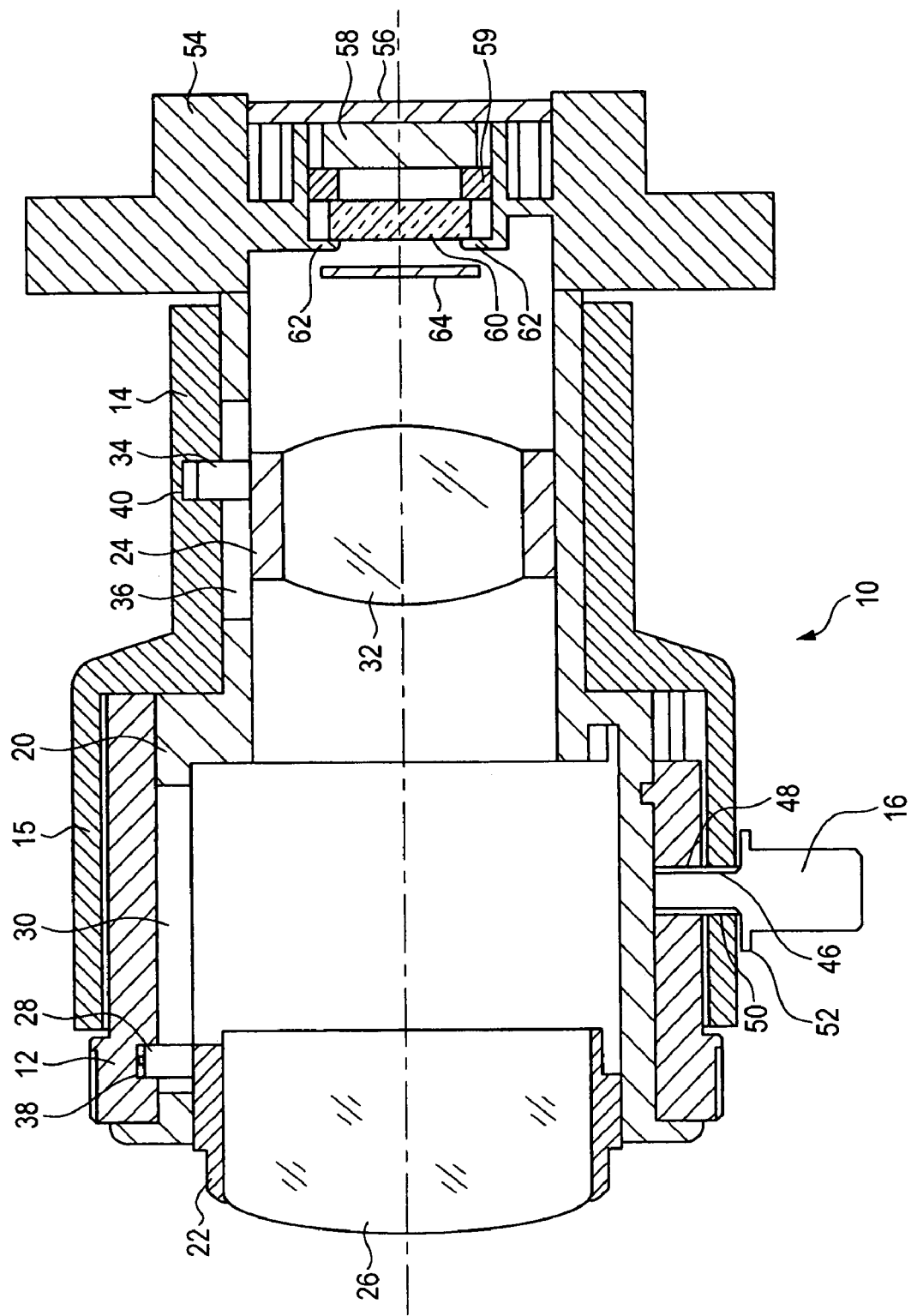
FIG. 2 is a sectional view showing the constitution of the monitoring lens apparatus in details.

FIG. 2 is a sectional view showing the constitution of the monitoring lens apparatus in details, showing a section along a face including an optical axis and a one-dotted chain line I-I in FIG. 1. As shown by FIG. 2, the monitoring lens apparatus 10 includes a fixed cylinder 20. A lens frame 22, and a lens frame 24 are arranged at an inner portion of the fixed cylinder 20. Further, the focus ring 12, the zoom ring 14 are arranged on an outer side of the fixed cylinder 20.

The lens frame 22 is a frame arranged on an object side (front side) of inside of the fixed cylinder 20 for holding a focus lens (group) 26. The lens frame 22 is mounted with an engaging pin 28 projected from a peripheral face thereof. On the other hand, the fixed cylinder 20 is formed with a straight advancing groove 30 in an optical axis direction, by engaging the engaging pin 28 to the straight advancing groove 30, the lens frame 22 and the focus lens 26 are constituted to move to advance straight in the optical axis direction by being guided by the straight advancing groove 30.

The lens frame 24 is arranged on a rear side of the lens frame 22 at inside of the fixed cylinder 20. The lens frame 24 is a frame for holding a zoom lens (group) 32. The lens frame 24 is mounted with an engaging pin 34 projected from a peripheral face thereof. On the other hand, the fixed cylinder 20 is formed with a straight advancing groove 36 in the optical axis direction, by engaging the engaging pin 34 with the straight advancing groove 36, the lens frame 24 and the zoom lens 32 are constituted to move to advance straight in the optical axis direction by being guided by the straight advancing groove 36.

The focus ring 12 is arranged pivotably to an outer peripheral face of the fixed cylinder 20 at a portion of arranging the lens frame 22. An inner peripheral face of the focus ring 12 is formed with a cam groove 38 spirally relative to the optical axis. The engaging pin 28 mounted to the lens frame 22 is engaged with the cam groove 38 of the focus ring 12. Therefore, when the focus ring 12 is operated to pivot, a position of intersecting the cam groove 38 of the focus ring 12 and the straight advancing groove 30 of the fixed cylinder 20 is displaced in the optical axis direction, and the engaging pin 28, the lens frame 22, and the focus lens 26 are displaced in the optical axis direction in accordance with the intersecting position. In this way, by operating to pivot the focus ring 12, the focus can be adjusted by adjusting the position of setting the focus lens 26.

The zoom ring 14 is arranged pivotably at the outer peripheral face of the fixed cylinder 20 on a rear side of the focus ring 12. Further, the zoom ring 14 is provided with an extended portion 15 on a side of the focus ring 12. At the extended portion 15, an inner diameter of the zoom ring 14 is enlarged to cover an outer periphery of the focus ring 12.

An inner peripheral face of the zoom ring 14 is formed with a cam groove 40 spirally relative to the optical axis. The engaging pin 34 mounted to the lens frame 24 is engaged with the cam groove 40 of the zoom ring 14. Therefore, when the zoom ring 14 is operated to pivot, a position of intersecting the cam groove 40 of the zoom ring 14 and the straight advancing groove 36 of the fixed cylinder 20 is displaced in the optical axis direction, and the engaging pin 34, the lens frame 24, and the zoom lens 32 are displaced in the optical axis direction in accordance with the intersecting position. In this way, by operating to pivot the zoom ring 14, a focal length (zoom angle of view) can be adjusted by adjusting the position of setting the zoom lens 32.

Further, although in the above-described constitution, the straight advancing grooves 30, 36 are provided at the fixed cylinder 20, the spiral cam grooves 38, 40 are provided at the focus ring 12, the zoom ring 14, the spiral grooves may be provided at the fixed cylinder 20, the straight line cam groove may be provided at the focus ring 12 or the zoom ring 14. Further, the spiral cam grooves may be provided at both of the fixed cylinder 20 and the focus ring 12 or the zoom ring 14.

As shown by FIG. 1, an end portion on a front side of the focus ring 12 is provided with a recessed and projected portion 42 on an outer periphery thereof. Further, an end portion on a front side of the zoom ring 14 is provided with a plurality of claws 44 on an outer periphery thereof. The focus ring 12 is pivoted by holding the recessed and projected portion 42 by an operator. On the other hand, the zoom ring 14 is pivoted by holding the claw 44 by the operator. According to the monitoring lens apparatus 10 of the embodiment, the zoom ring 14 is provided with the extended portion 15, the front side of the zoom ring 14 is constituted to cover the focus ring 12, and therefore, the recessed and projected portion 42 and the claws 44 can be provided to be proximate to each other, further, both of the recessed and projected portion 42 and the claws 44 can be provided at a front end portion of the monitoring lens apparatus 10.

At a portion of covering the focus ring 12 by the extended portion 15 of the zoom ring 14, a gap is provided between the inner peripheral face of the zoom ring 14 and an outer peripheral face of the focus ring 12. Further, although according to the monitoring lens apparatus 10 of the embodiment, the focus ring 12 is provided on the object side of the zoom ring 14, when the zoom lens 32 is disposed on the object side of the focus lens 26, the zoom ring 14 may be constituted to be disposed on the object side of the focus ring 12. In this case, the focus ring 12 is constituted to be provided with an extended portion to cover the zoom ring 14 by the extended portion.

The lock knob 16 is provided to be projected from an outer periphery of the extended portion 15 of the zoom ring 14. As shown by FIG. 2, an outer periphery on an optical axis side of the lock knob 16 is formed with a male screw 46. The male screw 46 is engaged with a female screw 48 provided at the focus ring 12. The zoom ring 14 is formed with an open hole portion 50 having a width wider than a diameter of the male screw 46 of the lock knob 16. The lock knob 16 is inserted to the focus ring 12 by being inserted into the open hole portion 50 and engaging the male screw 46 and the female screw 48. As shown by FIG. 1, the open hole portion 50 is formed by a shape of a long hole in a circumferential direction of the zoom ring 14. Further in details, the open hole portion 50 is formed by an angular range such that the lock knob 16 and the open hole portion 50 do not interfere with each other when the focus ring 12 and the zoom ring 14 are relatively rotated.

Further, the lock knob 16 is formed with a flange portion 52. In a state of mounting the lock knob 16 to the focus ring 12, outer peripheral faces of the flange portion 52 and the zoom ring 14 are constituted to be opposed to each other.

When the lock knob 16 is fastened, a front end of the lock knob 16 is brought into contact with an outer periphery of the fixed cylinder 20 by engaging the male screw 46 and the female screw 48. Thereby, a rotational position of the focus ring 12 is fixed. Further, when the lock knob 16 is fastened, the flange portion 52 is brought into contact with an outer periphery of the extended portion 15 of the zoom ring 14. Thereby, a rotational position of the zoom ring 14 is fixed.

As shown by FIG. 2, a rear end portion of the fixed cylinder 20 is mounted with an image taking element holder 54. A board 56 is mounted to the image taking element holder 54. A CCD (image taking element) 58 is mounted to the board 56. A seal rubber 59 is provided at a front side of CCD 58, and a low pass filter (OLPF) 60 is arranged at further front side of the seal rubber 59. A front portion of the low pass filter 60 is brought into contact with a holding portion 62 of the image taking element holder 54. Further, an IR cut filter 64 is arranged at a further front side of the low pass filter 60. The IR cut filter 64 includes two of a filter for cutting infrared ray and a filter for transmitting infrared ray. The two filters provided to the IR cut filter 64 are switched by being driven by the drive apparatus 18.

Figure 3:
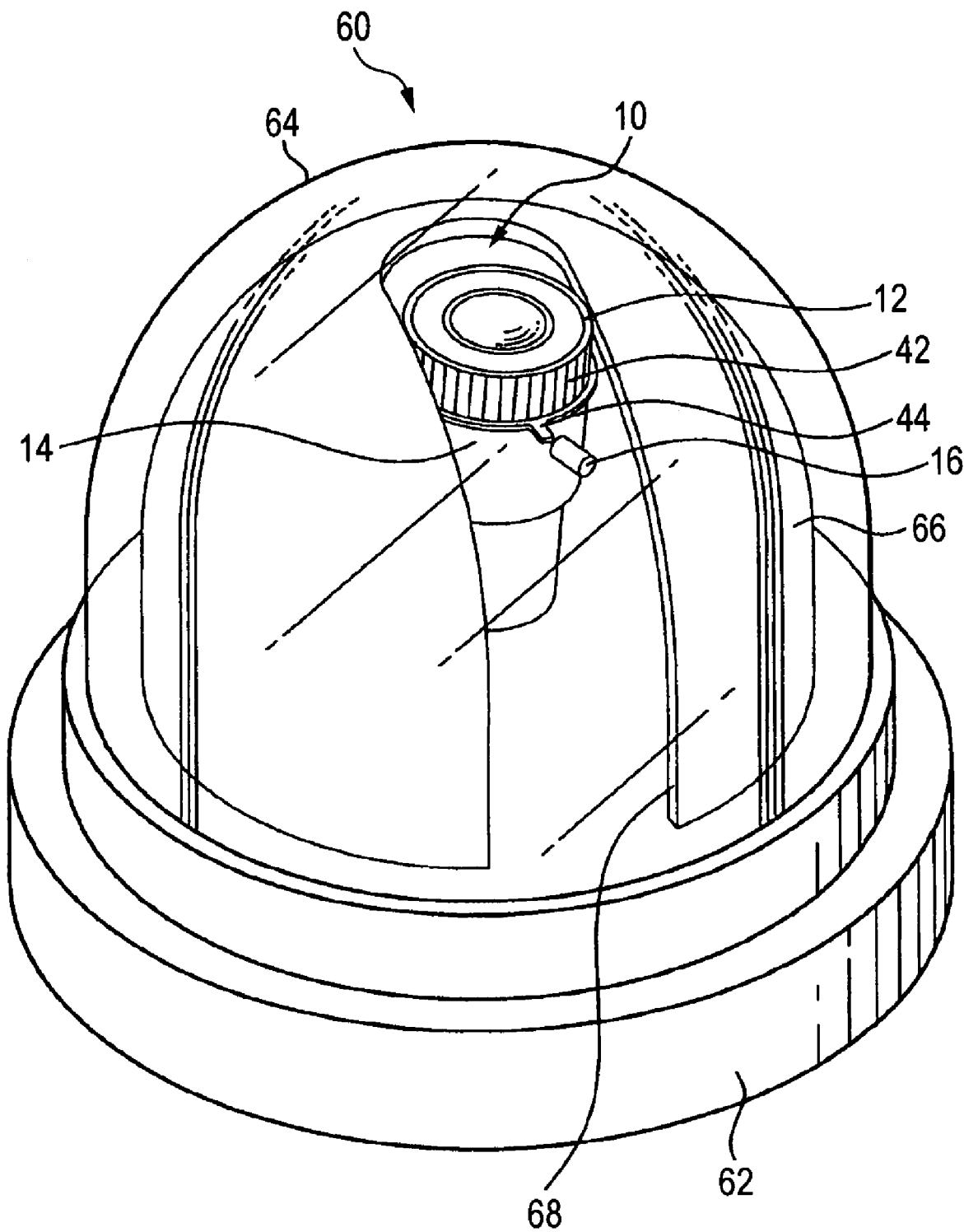
FIG. 3 is a schematic view showing a small-sized monitoring camera including the monitoring lens apparatus according to the embodiment.
Figure 4:
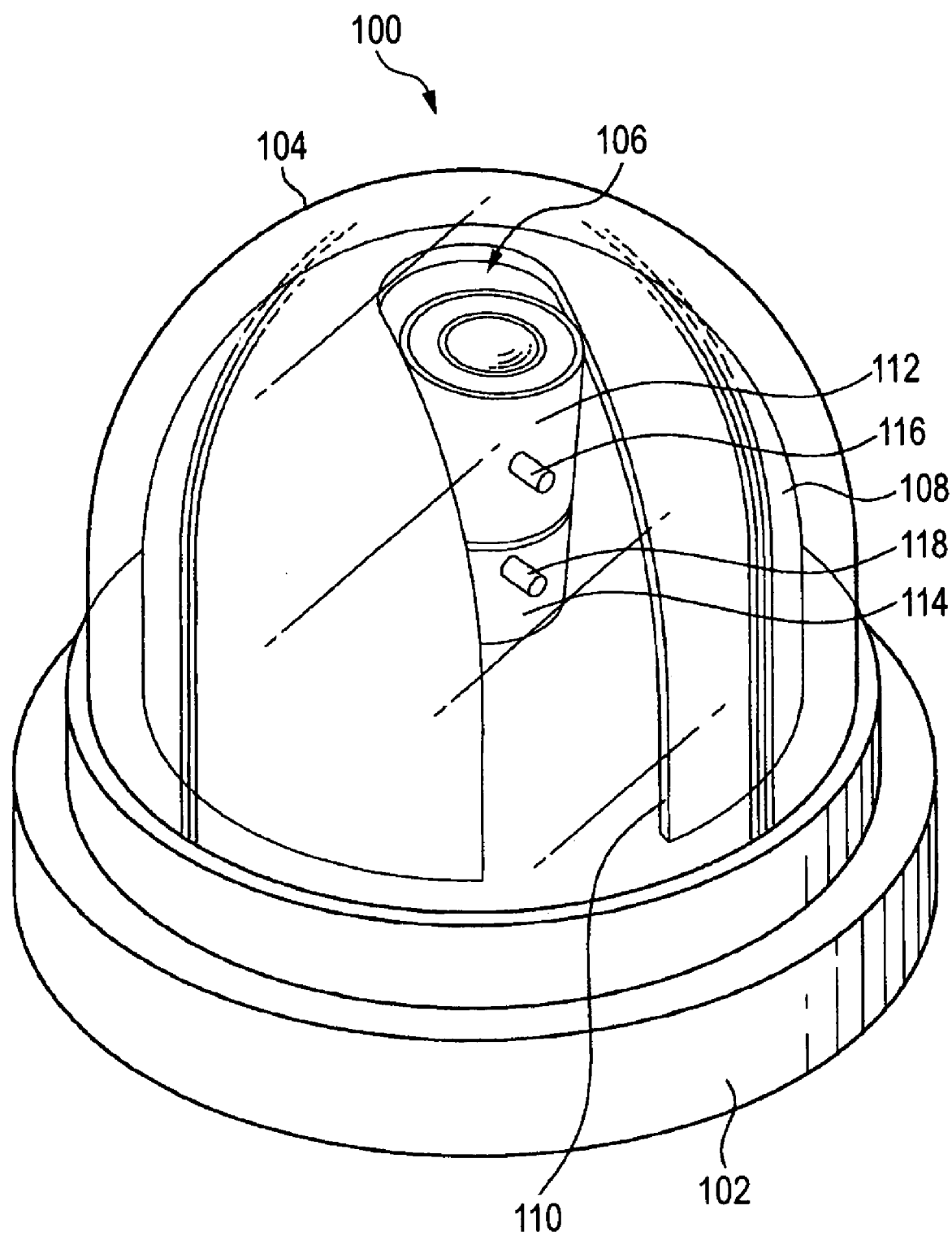
FIG. 4 is a perspective view showing a dome-type monitoring camera.

FIG. 3 is a schematic view showing a small-sized monitoring camera 60 including the monitoring lens apparatus 10 according to the embodiment. The monitoring camera 60 shown in FIG. 3 is provided with a dome-like outlook similar to that explained in reference to FIG. 4 and FIG. 5, and includes a base 62, a transparent case member 64, and a cover member 66 provided at an inner portion of the case member 64 for covering the monitoring lens apparatus 10. The cover member 66 is provided with an opening 68 in correspondence with a front end portion of the monitoring lens apparatus 10. Similar to the monitoring camera 100 of FIG. 4 and FIG. 5, the monitoring lens apparatus 10 can make the angle θ variable relative to the base 62, and can be rotated relative to the base 62.

According to the monitoring lens apparatus 10 of the embodiment, the zoom ring 14 is provided with the extended portion 15, the front end portion of the zoom ring 14 is extended to cover the focus ring 12, and therefore, an operating portion (recessed and projected portion 42) of the focus ring 12 and an operating portion (claw 44) of the zoom ring 14 can be proximately arranged. Further, both of the operating portion of the focus ring 12 and the operating portion of the zoom ring 14 can be arranged at the vicinity of the end portion on the front side of the monitoring lens apparatus 10. Both of the focus ring 12, the zoom ring 14 can be operated at the vicinity of the end portion on the front side of the monitoring lens apparatus 10. Thereby, in operating the focus ring 12, the zoom ring 14, it is not necessary to insert the finger tip to the rear side of the monitoring lens apparatus 10, and the focus ring 12, the zoom ring 14 can easily be operated.

Particularly, by providing the extended portion 15, the operating portion (claw 44) of the zoom ring 14 can be provided on the front side of the monitoring lens apparatus 10, and therefore, the zoom ring 14 provided on the rear side in the optical axis direction can easily be operated. Further, the lock knob 16 for fixing the focus ring 12, the zoom ring 14 is summarized to one and arranged on the front side of the monitoring lens apparatus 10, and therefore, also the lock knob 16 can easily be operated.

Therefore, when the monitoring lens apparatus 10 is mounted to the small-sized monitoring camera 60, even in a case in which the opening 68 of the cover member 66 is very small, the focus ring 12, the zoom ring 14 can easily be operated without inserting the finger tip from the opening 50 to a depth side. Further, also in operating the lock knob 16, the lock knob 16 can easily be operated without inserting the finger tip from the opening 50 to the depth side.

Further, the focus ring 12 and the zoom ring 14 can be locked in one operation by the lock knob 16, and therefore, the focus ring 12 and the zoom ring 14 can be locked simply and conveniently, and also a number of parts can be reduced.

Therefore, according to the embodiment, even when the monitoring camera 60 is small-sized and a sufficient space cannot be ensured at a vicinity of the monitoring lens apparatus 10, the focus ring 12, the zoom ring 14 can be operated and the rings can be fixed by the lock knob 16 easily. Therefore, even after mounting the monitoring camera 60 to a ceiling, a wall face or the like, the focus and the zoom can easily be adjusted only by detaching the case member 64.

Figure 5:
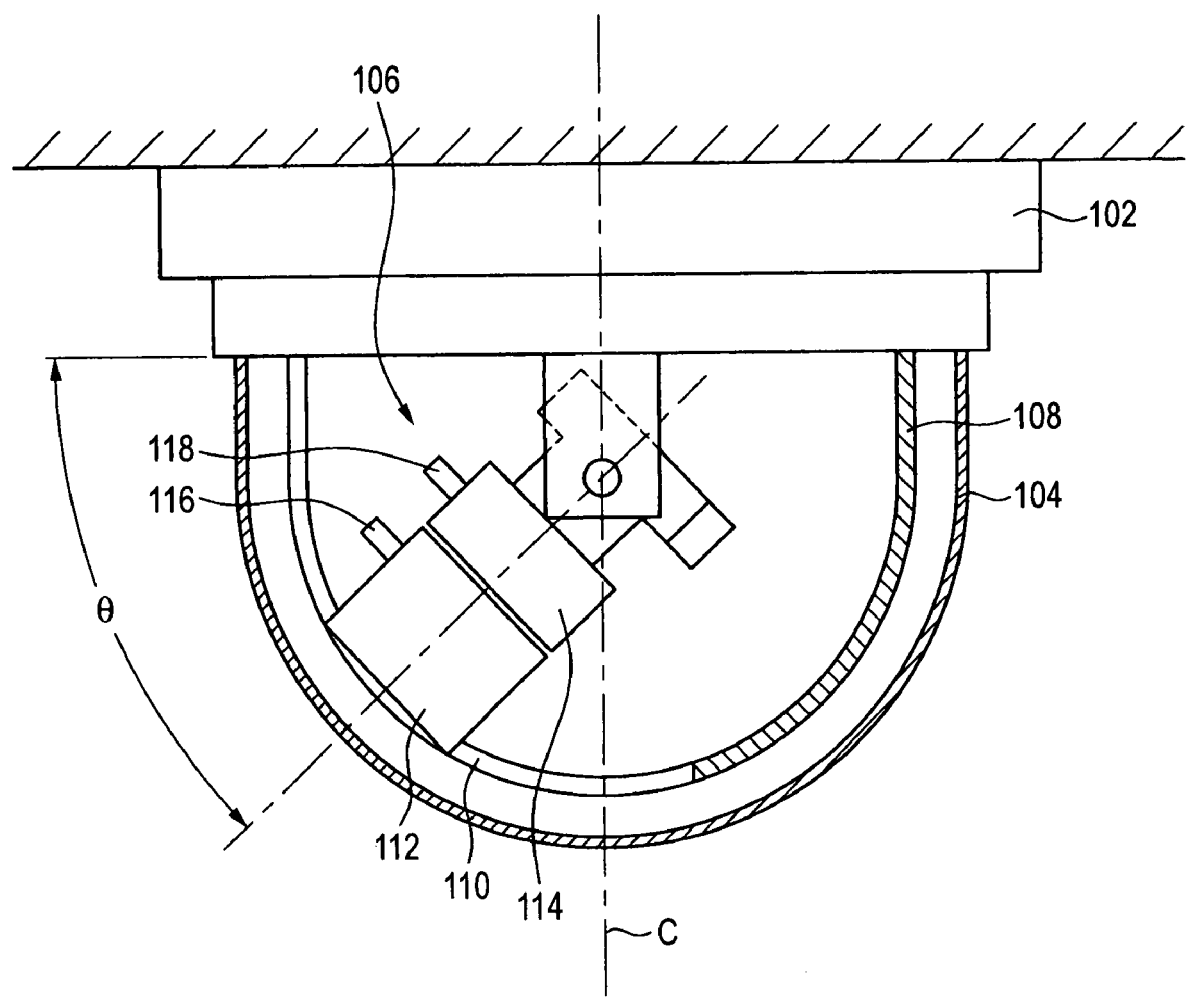
FIG. 5 is a sectional view showing a state of attaching the monitoring camera to a ceiling.

Further, even when the monitoring camera are not provided with the case member 64, the cover member 66, both of the focus ring 12, the zoom ring 14 can be operated at the vicinity of the end portion of the front side of the monitoring lens apparatus 10. Therefore, even when the monitoring lens apparatus 10 is directed to a direction difficult to be operated for the direction of the body, the direction of the finger of the operator, the focus ring 12, the zoom ring 14 can easily be operated. Further, since both of the focus ring 12, the zoom ring 14 can be operated at the vicinity of the end portion of the front side of the monitoring lens apparatus 10, even when the angle θ explained in reference to FIG. 5 is very small, the focus ring 12, the zoom ring 14 can easily be operated.

As explained above, according to the embodiment, the operating portion of the focus ring 12 and the operating portion of the zoom ring 14 are made to be proximate to each other, the respective operating portions are provided at the vicinity of the end portion on the front side of the monitoring lens apparatus 10, and therefore, both of the focus ring 12 and the zoom ring 14 can be operated at the vicinity of the front end portion of the monitoring lens apparatus 10. Therefore, even when the monitoring lens apparatus 10 is mounted to the small-sized monitoring camera 60 and a sufficient space cannot be ensured at a periphery of the monitoring lens apparatus 10, the focus ring 12, the zoom ring 14 can easily be operated.

Although an explanation has been given of the preferable embodiment of the invention in reference to the attached drawings as described above, the invention is not naturally limited to such example. It is apparent that the skilled person can conceive various change examples or modified examples within the range described in the scope of claims, and it is understood that the change examples and the modified examples pertain to the technical range of the invention.

This application claims foreign priority from Japanese Patent Application No. 2006-140518, filed May 19, 2006, the entire disclosure of which is herein incorporated by reference.

What is claimed is;

1. A monitoring lens apparatus comprising:
   a fixed cylinder;
   a first lens frame disposed inside the fixed cylinder, the first lens frame being movable in an optical axis direction;
   a second lens frame disposed inside the fixed cylinder, the second lens frame being movable in the optical axis direction;
   a first ring pivotable to the fixed cylinder, the first ring having a cam for driving the first lens frame;
   a second ring pivotable to the fixed cylinder, the second ring being disposed on an object side of the first ring and having a cam for driving the second lens frame;
   an extended portion provided integrally with the first ring and extended to the object side to cover an outer periphery of the second ring, and
   a lock knob inserted to an open hole portion at the extended portion, the lock knob being engaged with a screw hole at the second ring for fixing both of rotational positions of the first and the second rings.

2. The monitoring lens apparatus according to claim 1, wherein the open hole portion has a shape of a long hole in accordance with a change in a relative angular position of the first ring and the second ring.

3. A dome type monitoring camera comprising:
   a monitoring lens apparatus comprising:
      a fixed cylinder,
      a first lens frame disposed inside the fixed cylinder, the first lens frame being movable in an optical axis direction,
      a second lens frame disposed inside the fixed cylinder, the second lens frame being movable in the optical axis direction,
      a first ring pivotable to the fixed cylinder, the first ring having a cam for driving the first lens frame,
      a second ring pivotable to the fixed cylinder, the second ring being disposed on an object side of the first ring and having a cam for driving the second lens frame,
      an extended portion provided integrally with the first ring and extended to the object side to cover an outer periphery of the second ring,
      a first operating portion at the extended portion, the first operating portion being held when operating the first ring, and
      a second operating portion at the second ring, the second operating portion being held when operating the second ring;
   wherein the first operating portion and the second operating portion are disposed proximately to a vicinity of an end portion on the object side of the monitoring lens apparatus;
   a transparent case member that covers the object side of the monitoring lens apparatus; and
   a cover member disposed on a side of the monitoring lens apparatus of the case member, the cover member covering the monitoring lens apparatus and having an opening in correspondence with a front end portion on the object side of the monitoring lens apparatus,
   wherein the operator of the dome type monitoring camera does not need to insert a finger tip to a rear side of the monitoring lens apparatus, away from the front end portion on the object side of the monitoring lens apparatus, when operating the first ring or the second ring.

4. The monitoring camera according to claim 3, wherein the extended portion has an open hole portion having a shape of a long hole in accordance with a change in a relative angular position of the first ring and the second ring.

5. The monitoring camera according to claim 4, wherein the open hole portion is constituted by a shape of a long hole in accordance with a change in a relative angular position of the first ring and the second ring.

6. The monitoring camera according to claim 3, wherein the first lens frame holds a zoom adjusting lens, the second lens frame holds a focus adjusting lens, the first ring is a zoom ring, and the second ring is a focus ring.

7. A monitoring camera according to claim 4, wherein the open hole is an elongate opening in correspondence with a range of changing an angle θ of the monitoring lens apparatus.

8. A monitoring camera according to claim 3, wherein the cover member can be rotated relative to a base of the monitoring lens apparatus.

9. A monitoring camera according to claim 7, wherein the cover member can be rotated relative to a base of the monitoring lens apparatus.

* * * * *